Jan. 11, 1927.

W. E. MENZIES

ELECTRICAL SYSTEM

Filed May 10, 1922

1,614,141

WITNESSES:
C. N. Cochran
J. R. Langley

INVENTOR
William E. Menzies
BY
Wesley G. Carr
ATTORNEY

Patented Jan. 11, 1927.

1,614,141

UNITED STATES PATENT OFFICE.

WILLIAM E. MENZIES, OF IRWIN, PENNSYLVANIA, ASSIGNOR TO WESTINGHOUSE ELECTRIC & MANUFACTURING COMPANY, A CORPORATION OF PENNSYLVANIA.

ELECTRICAL SYSTEM.

Application filed May 10, 1922. Serial No. 559,801.

My invention relates to electrical systems and particularly to such systems as are employed for charging storage batteries.

My invention has for its object to provide an arrangement whereby a storage battery of relatively low voltage may be safely and economically charged from a system of relatively high voltage.

A second object of my invention is to provide a system whereby the storage battery of an automobile may be safely and conveniently charged without the necessity of removing the battery from the vehicle.

Heretofore, in charging a battery from a source of relatively high voltage, it has been necessary to insert a resistor of relatively high value in circuit with the battery in order that the battery may not be charged at an excessive rate. This arrangement is extremely wasteful, as it may happen that the voltage of the battery is a small percentage of that of the system from which energy is supplied. For example, if a six-volt battery for an automobile or motor vehicle is charged from a lighting circuit of 110 to 115 volts, the amount of resistance necessary is such that the greater portion of the energy is wasted. The portion of energy lost is also relatively high when systems of 32 to 42 volts, such as farm-lighting plants or similar systems, are employed for charging six-volt vehicle storage batteries.

According to my invention, I connect a storage battery of relatively low voltage in series with a direct-current lighting circuit, such as that of an isolated plant, which may have a relatively high voltage. Since the voltage applied to the lamps of such systems usually exceeds the minimum value necessary, the amount of energy consumed by the storage battery is so small as not to impair unduly the normal brilliancy of the lamps. The presence of the lamps in the circuit ensures that the battery is charged at a safe rate.

My invention will be described in connection with the accompanying drawing, in which—

Figure 1:
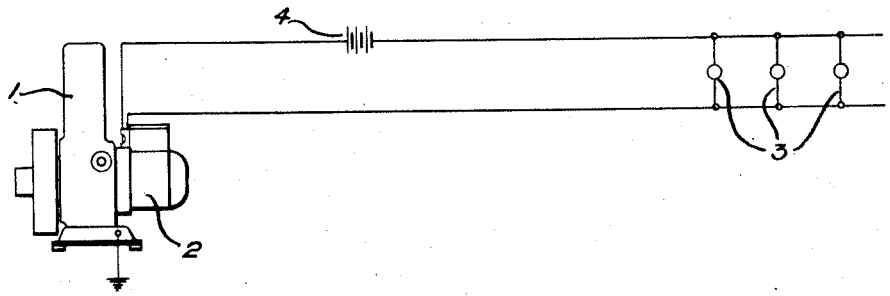
Figure 1 is a diagrammatic view of circuits and apparatus embodying my invention.

Referring particularly to Fig. 1, a power plant consisting of an internal-combustion engine 1 and a dynamo-electric machine 2 supplies energy to a plurality of lamps 3. A storage battery 4 that is to be charged is connected in series with the lamps 3.

It may be assumed that the voltage of the system is 32 to 42 volts and that the voltage of the battery is 6 volts. Inasmuch as the battery is in series with the lamps, the rate of charging is determined by the rate of current consumption of the lamps that are in circuit.

If the circuits of the vehicle that is supplied by the storage battery 4 are open, the battery may be charged without removing it from the vehicle or without disconnecting its terminals from the usual lighting and ignition circuits.

Figure 2:
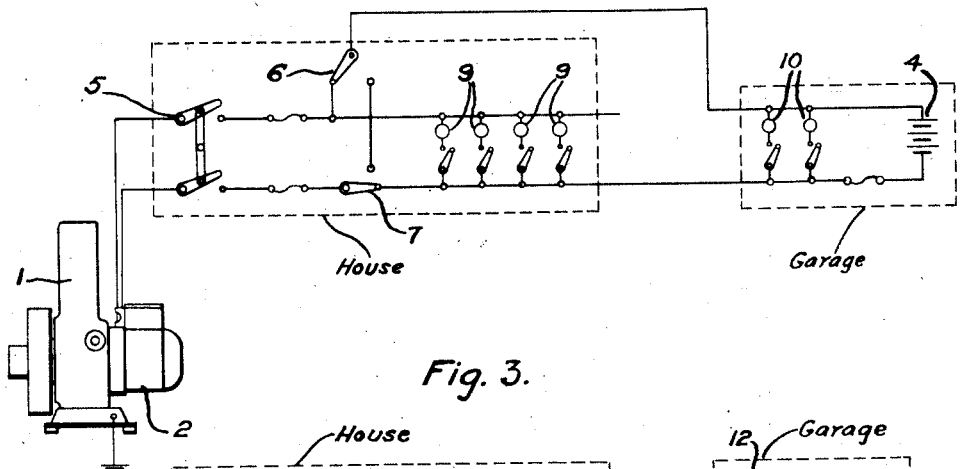
Fig. 2 is a similar view of a modification.

Reference may now be had to Fig. 2, wherein a somewhat different arrangement of circuits is employed. In the system of Fig. 2, it is assumed that the power plant supplies both a house-lighting circuit and a garage-lighting circuit, as indicated by the dotted lines and appropriate legends applied thereto. A main switch 5 controls the load circuit of the dynamo-electric machine 2 and a two-position switch 6 controls the garage-lighting circuit to normally connect it in parallel relation to the house-lighting circuit. A two-way switch 7 co-operates with the switch 6 to connect the garage-lighting circuit in series with the house-lighting circuit when it is desired to charge the battery 4.

It may be assumed that the lamps 9 of the house-lighting circuit are supplied with energy from the power plant. It may be assumed further that the automobile is in the garage and that it is desired to charge the storage battery 4. The terminals of the battery are connected to the garage-lighting circuit in any suitable manner, such, for example, as that illustrated in Fig. 2, the switch 5 being open.

In order to connect the storage battery 4 in series with the lamps 9 of the house-lighting circuit, the switch 6 is actuated to its right-hand position and the switch 7 is actuated to its upper position. The switch 5 is closed and the charging operation then proceeds, the rate of charging depending upon the number of lamps 9 in circuit. The rate of charging may be diminished by connecting one or more of the lamps 10 in circuit. The lamps 10 will not be of normal brilliancy and may not be incandescent when in parallel circuit with the battery, but this fact is immaterial as the battery will ordinarily be charged when the lamps are not needed.

Figure 3:
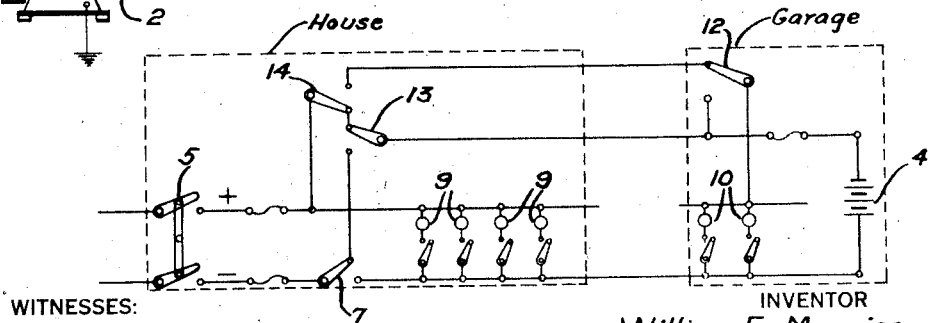
Fig. 3 is a similar view of a second modification.

In a second modification, shown in Fig. 3, a three-wire system is employed which enables the operator to control the garage lamps from the house. A switch 12 must be in its upper position, as illustrated, when the battery 4 is in circuit; otherwise the latter may be connected directly across the line.

When the switch 13 is in its lower position and switch 7 is in the position in which it is shown, the battery is in series with the house lamps 9, as will be readily observed. The garage lamps 10 are not in circuit.

To connect the lamps 10 in circuit, the switch 14 is actuated to its upper position. The battery is then in series with both the house lamps 9 and the garage lamps 10, the lighting circuits being in parallel relation to each other. The switches 7 and 14 may be suitably interlocked to prevent the former from being actuated to its lower position while the switch 14 occupies its lower position and thus connecting the battery across the line of relatively high voltage.

As above stated, the amount of energy consumed by the battery is only such as to prevent abnormal brilliancy of the lamps. The presence of the battery in the circuit causes current of reduced value to traverse the lighting circuit which usually operates at several volts above that normally required by the lamps.

I claim as my invention:—

1. In an electrical system, the combination with a plurality of lighting circuits and a source of energy therefor, of a battery of relatively low voltage detachably connected to one of said circuits, and means for connecting said circuits in series or in parallel relation.

2. In an electrical system, the combination with a plurality of lighting circuits and a source of energy therefor, of a battery of relatively low voltage detachably connected to one of said circuits, and switching means for connecting said circuits in series or in parallel relation according to the electrical connection of said battery.

In testimony whereof, I have hereunto subscribed my name this first day of May 1922.

WILLIAM E. MENZIES.